US011182885B2

(12) United States Patent
Huang et al.

(10) Patent No.: US 11,182,885 B2
(45) Date of Patent: Nov. 23, 2021

(54) METHOD AND APPARATUS FOR IMPLEMENTING IMAGE ENHANCEMENT, AND ELECTRONIC DEVICE

(71) Applicant: BEIJING SENSETIME TECHNOLOGY DEVELOPMENT CO., LTD., Beijing (CN)

(72) Inventors: Mingyang Huang, Beijing (CN); Jianping Shi, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/798,356

(22) Filed: Feb. 22, 2020

(65) Prior Publication Data

US 2020/0193577 A1 Jun. 18, 2020

Related U.S. Application Data

(63) Continuation of application No. PCT/CN2018/106315, filed on Sep. 18, 2018.

(30) Foreign Application Priority Data

Sep. 19, 2017 (CN) .......................... 201710845809.8

(51) Int. Cl.
  *G06T 5/20* (2006.01)
  *G06K 9/62* (2006.01)
  *G06T 5/00* (2006.01)

(52) U.S. Cl.
  CPC .............. *G06T 5/20* (2013.01); *G06K 9/6215* (2013.01); *G06T 5/005* (2013.01);
  (Continued)

(58) Field of Classification Search
  None
  See application file for complete search history.

(56) References Cited

U.S. PATENT DOCUMENTS

| 8,345,114 B2 * | 1/2013 | Ciuc | G06T 11/60 |
| | | | 348/222.1 |
| 10,972,709 B2 * | 4/2021 | Bao | G06T 5/009 |

(Continued)

FOREIGN PATENT DOCUMENTS

| CN | 101043579 A | 9/2007 |
| CN | 101464998 A | 6/2009 |

(Continued)

OTHER PUBLICATIONS

Ding, Liya, and Aleix M. Martinez. "Precise detailed detection effaces and facial features." 2008 IEEE Conference on Computer Vision and Pattern Recognition. IEEE, 2008. (Year: 2008).*

(Continued)

*Primary Examiner* — Andrae S Allison
(74) *Attorney, Agent, or Firm* — Syncoda LLC; Feng Ma

(57) ABSTRACT

A method for implementing image enhancement includes: performing filtering processing on a to-be-processed image to obtain an image subjected to the filtering processing; determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point.

20 Claims, 12 Drawing Sheets

(52) U.S. Cl.
CPC .............. *G06T 2207/10016* (2013.01); *G06T 2207/10024* (2013.01); *G06T 2207/20012* (2013.01); *G06T 2207/30201* (2013.01)

(56) References Cited

U.S. PATENT DOCUMENTS

| | | | | |
|---|---|---|---|---|
| 2006/0120618 | A1* | 6/2006 | Mizoguchi | G06T 11/60 382/255 |
| 2007/0223834 | A1* | 9/2007 | Lertrattanapanich | G06T 5/004 382/263 |
| 2009/0238488 | A1* | 9/2009 | Joon-Ki | G06T 3/403 382/264 |
| 2010/0026831 | A1* | 2/2010 | Ciuc | G06K 9/00221 348/222.1 |
| 2011/0142298 | A1* | 6/2011 | Akbarzadeh | G06K 9/6212 382/118 |
| 2014/0267653 | A1* | 9/2014 | Richardson | H04N 5/142 348/65 |
| 2015/0302564 | A1* | 10/2015 | Ho | G06T 5/20 382/167 |
| 2018/0174370 | A1* | 6/2018 | Chen | G06T 15/005 |
| 2020/0043213 | A1* | 2/2020 | Bao | G06T 11/001 |

FOREIGN PATENT DOCUMENTS

| | | |
|---|---|---|
| CN | 103020914 A | 4/2013 |
| CN | 104715221 A | 6/2015 |
| CN | 104715463 A | 6/2015 |
| CN | 106651796 A | 5/2017 |
| CN | 106780311 A | 5/2017 |
| CN | 108230255 A | 6/2018 |

OTHER PUBLICATIONS

International Search Report in the international application No. PCT/CN2018/106315, dated Dec. 20, 2018.
English Translation of the Written Opinion of the International Search Authority in the international application No. PCT/CN2018/106315, dated Dec. 20, 2018.
First Office Action of the Chinese application No. 201710845809.8, dated Dec. 4, 2019.

* cited by examiner

METHOD AND APPARATUS FOR IMPLEMENTING IMAGE ENHANCEMENT, AND ELECTRONIC DEVICE

CROSS-REFERENCE TO RELATED APPLICATIONS

The present application is a continuation of International Application No. PCT/CN2018/106315 filed on Sep. 18, 2018, which claims priority to Chinese Patent Application No. 201710845809.8 filed on Sep. 19, 2017. The disclosures of these applications are hereby incorporated by reference in their entirety.

BACKGROUND

Image enhancement technology is a research topic in the field of computer vision. As image enhancement technology may improve the visual effect of an image, and therefore, image enhancement technology has been increasingly applied to portrait embellishing. In one specific example, image filtering processing may be performed on a photo by using image enhancement technology, flaws such as dark spots, acne, and wrinkles on the human face in the photo may be removed or lightened, thereby achieving a beautifying effect.

SUMMARY

The present disclosure relates to computer vision technologies, and in particular, to a method and apparatus for implementing image enhancement, and an electronic device.

Implementations of the present disclosure provide technical solutions for implementing image enhancement.

According to one aspect of the implementations of the present disclosure, provided is a method for implementing image enhancement, including: performing filtering processing on a to-be-processed image to obtain an image subjected to the filtering processing; determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point.

According to another aspect of the implementations of the present disclosure, provided is a method for implementing image enhancement, including performing filtering processing on a to-be-processed image, and the filtering processing includes: obtaining pixel values of at least part of pixel points within a sliding window; and updating pixel values of pixel points at predetermined positions within the sliding window according to a calculation result of the obtained pixel values of the at least part of pixel points.

According to still aspect of the implementations of the present disclosure, provided is an apparatus for implementing image enhancement, including: a filtering processing module, configured to perform filtering processing on a to-be-processed image to obtain an image subjected to the filtering processing; a similarity degree module, configured to determine similarity degrees between pixel points in the to-be-processed image and a target region of a target object in the to-be-processed image; and a fusion processing module, configured to fuse the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point.

According to still aspect of the implementations of the present disclosure, provided is an apparatus for implementing image enhancement, including a filtering processing module configured to perform filtering processing on a to-be-processed image, and the filtering processing module includes: a pixel point extracting unit, configured to obtain pixel values of at least part of pixel points within a sliding window; and a filtering processing unit, configured to update pixel values of pixel points at predetermined positions within the sliding window according to a calculation result of the obtained pixel values of the at least part of pixel points.

According to still aspect of the implementations of the present disclosure, provided is an electronic device, including: a memory, configured to store a computer program; and a processor, configured to execute the computer program stored in the memory, where when the computer program is executed, the following instructions are run: an instruction for performing filtering processing on a to-be-processed image to obtain an image subjected to the filtering processing; an instruction for determining similarity degrees between pixel points in the to-be-processed image and a target region of a target object in the to-be-processed image; and an instruction for fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point.

According to still aspect of the implementations of the present disclosure, provided is an electronic device, including: a memory, configured to store a computer program; and a processor, configured to execute the computer program stored in the memory, where when the computer program is executed, an instruction for performing filtering processing on a to-be-processed image is executed, and the instruction for performing filtering processing on a to-be-processed image includes: an instruction for obtaining pixel values of at least part of pixel points within a sliding window; and an instruction for updating pixel values of pixel points at predetermined positions within the sliding window according to a calculation result of the obtained pixel values of the at least part of pixel points.

According to still aspect of the implementations of the present disclosure, provided is a non-transitory computer storage medium having stored thereon a computer-readable instructions that, when executed by a processor, cause the processor to perform operations of a method in the implementations of the present disclosure, for example, performing filtering processing on a to-be-processed image to obtain an image subjected to the filtering processing; determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-beprocessed image, the stronger a filtering effect of the pixel point, and the lower a similarity degree between the pixel point and the target object in the to-be-processed image, the weaker a filtering effect of the pixel point; and for another example, performing filtering processing on a to-be-processed image, and the filtering processing includes: obtaining pixel values of at least part of pixel points within a sliding window; and updating pixel values of pixel points at predetermined positions within the sliding window according to a calculation result of the obtained pixel values of the at least part of pixel points.

According to still aspect of the implementations of the present disclosure, provided is a computer program, where the computer program is executed by a processor, operations of a method in the implementations of the present disclosure are executed, for example, performing filtering processing on a to-be-processed image to obtain an image subjected to the filtering processing; determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point; and for another example, performing filtering processing on a to-be-processed image, and the filtering processing includes: obtaining pixel values of at least part of pixel points within a sliding window; and updating pixel values of pixel points at predetermined positions within the sliding window according to a calculation result of the obtained pixel values of the at least part of pixel points.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
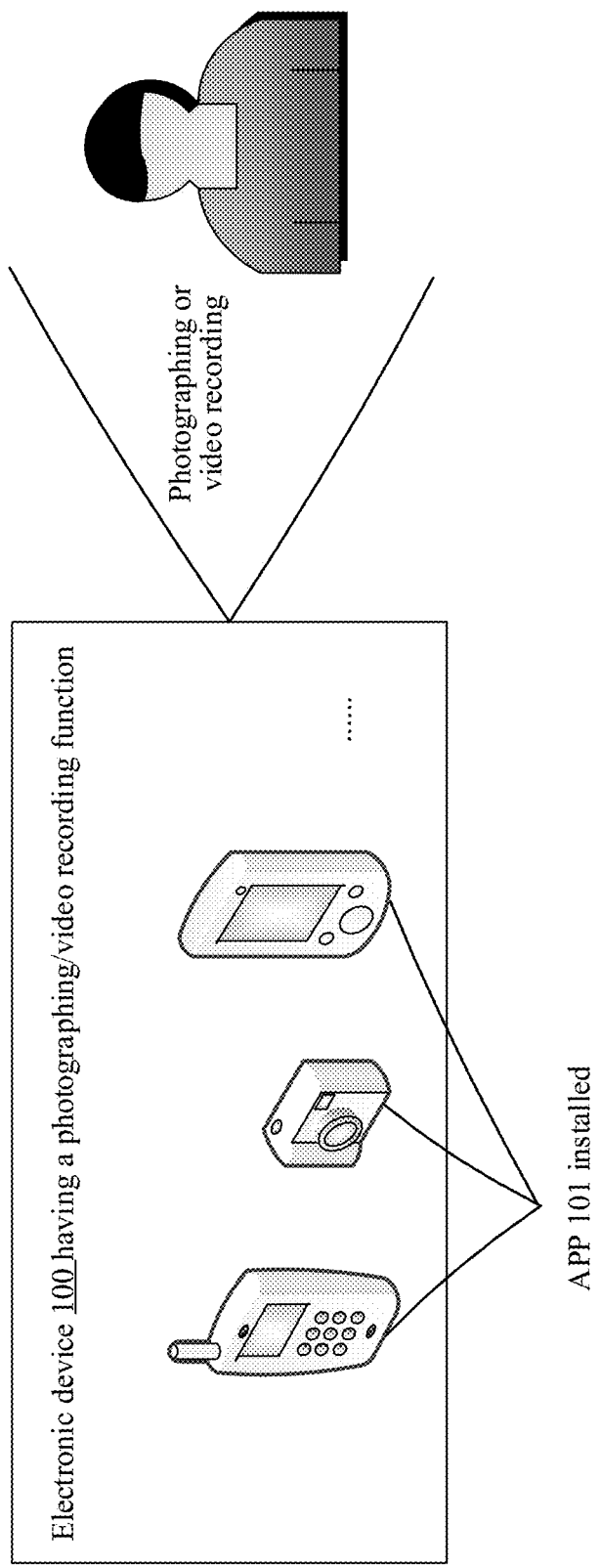
FIG. 1 is a schematic diagram of an application scenario according to embodiments of the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a schematic diagram of an application scenario according to embodiments of the present disclosure. With reference to FIG. 1, an application scenario according to embodiments of the present disclosure that may be implemented therein is schematically shown.

Image enhancement technology may improve the visual effect of an image, and therefore, image enhancement technology has been increasingly applied to portrait embellishing.

In one optional example, an Application (APP) 101 is installed in an electronic device 100 (for example, a smart mobile device such as a smart mobile phone or camera or tablet computer) shown in FIG. 1, and the APP 101 is an APP having a beautifying function. After a user enables the photographing/video recording function in his/her electronic device 100 to take a photo/record a video for himself/herself, a family member, a friend, or a colleague, the user actively starts the APP 101 in his/her electronic device 100 to perform beautifying processing on the photo taken/video recorded by him/her, thereby eliminating flaws on the human face in the photo/video.

Figure 2:
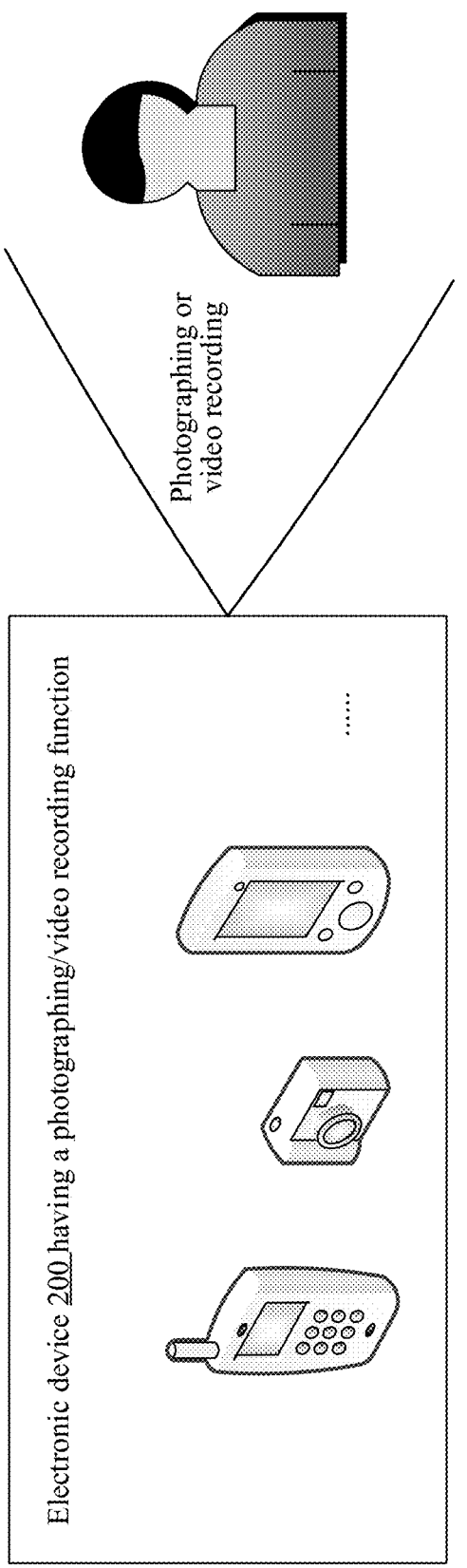
FIG. 2 is a schematic diagram of another application scenario according to embodiments of the present disclosure.

In another example, the photographing/video recording function in an electronic device 200 (for example, a smart mobile device such as a smart mobile phone or camera or tablet computer) shown in FIG. 2 supports beautifying. After a user enables the photographing/video recording function in his/her electronic device 200 to take a photo/record a video for himself/herself, a family member, a friend, or a colleague, the photographing/video recording function actively prompts the user whether to perform beautifying processing on the currently taken photo/recorded video, and after the user allows to perform beautifying processing on the currently taken photo/recorded video, the photographing/video recording function invokes a beautifying function to perform beautifying processing on the currently taken photo/recorded video, thereby eliminating flaws on the human face in the photo/video.

Figure 3:
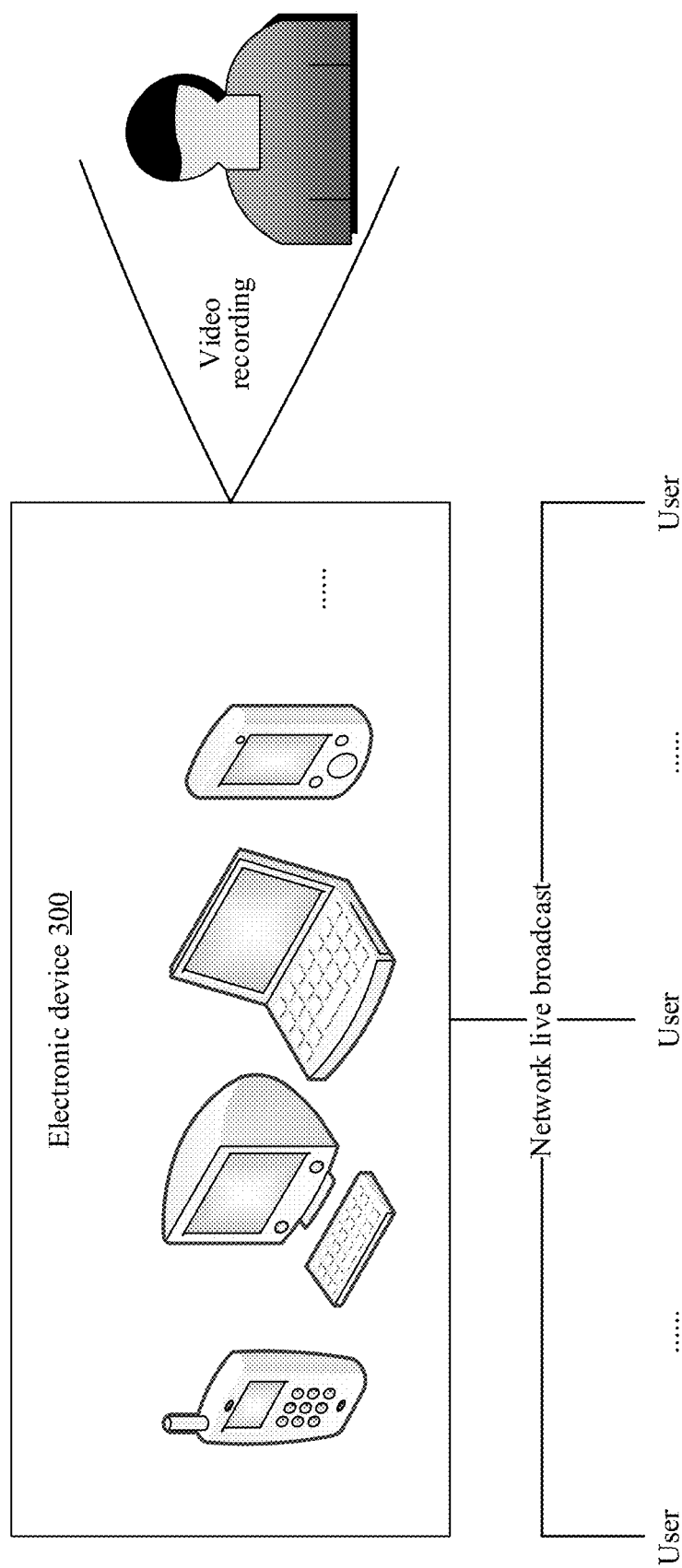
FIG. 3 is a schematic diagram of still application scenario according to embodiments of the present disclosure.

In still optional example, an electronic device 300 (for example, an electronic device having an Internet access capability such as a smart mobile phone or tablet computer or notebook computer or desktop computer or server) shown in FIG. 3 is an electronic device used for network live broadcast by a host. The host controls the electronic device 300 to run so as to implement network live broadcast and to execute a program code for beautifying processing, so that in the process that the host performs network live broadcast by using the electronic device 300, the electronic device 300 may perform beautifying processing on a portrait (for example, the host) in the live video currently extracted, thereby to eliminate the flaws on the face of the host in the live video, and the electronic device 300 sends in real time, over a network, the live video after the beautifying processing to users watching the live video, thus the live video watched by the users is the live video after the beautifying processing.

The beautifying processing in the present disclosure may also be referred to as dermabrasion processing or embellishing processing/cosmetology processing or the like.

However, a person skilled in the art may readily understand that the application scenario according to the implementations of the present disclosure is not limited by any aspect of the framework.

In the technical solutions for implementing image enhancement provided in the present disclosure, some detail parts in a to-be-processed image may be removed or lightened by performing filtering processing on the to-be-processed image (such as an original image or preprocessed image or the like), for example, the filtering processing may remove or lighten the flaws on the human face; a difference in the similarity degree between at least one pixel in the to-be-processed image and the target region may be reflected by using the similarity degrees between pixel points in the to-be-processed image and the target region (such as a skin region nearby a nose) of a target object in the to-be-processed image; by fusing the similarity degrees, the to-be-processed image and the image subjected to the filtering processing, a part of details removed or lightened by the filtering processing is still removed or lightened, while the other part removed or lightened by means of the filtering processing is shown; thus, the technical solutions provided in the present disclosure may avoid the phenomenon that the details that do not need to be removed or lightened in the image are removed or lightened in an image enhancement process.

In the technical solutions for implementing image enhancement provided in the present disclosure, in the filtering process, the pixel values of the pixel points at the predetermined positions within the sliding window are updated based on the pixel values of a part of pixel points within the sliding window, so that the amount of calculation in the filtering process may be effectively reduced, thereby improving the speed of the filtering processing, and thus the technical solutions for implementing image enhancement provided in the present disclosure have a certain real-time property, making it possible for the technical solutions for implementing image enhancement to be applied to a video.

As can be known from the foregoing description, according to the present disclosure, in the filtering process, filtering processing is implemented in a manner of extracting a part of pixel points, and image fusion is performed by using the similarity degrees, the to-be-processed image and the image subjected to the filtering processing, so that the technical solutions for implementing image enhancement in the present disclosure may retain detail content that should not be lost in the to-be-processed image (for example, an original image) as much as possible while having a real-time property to certain extent, and finally improve an image enhancement effect while satisfying an image enhancement requirement of a video.

Figure 4:
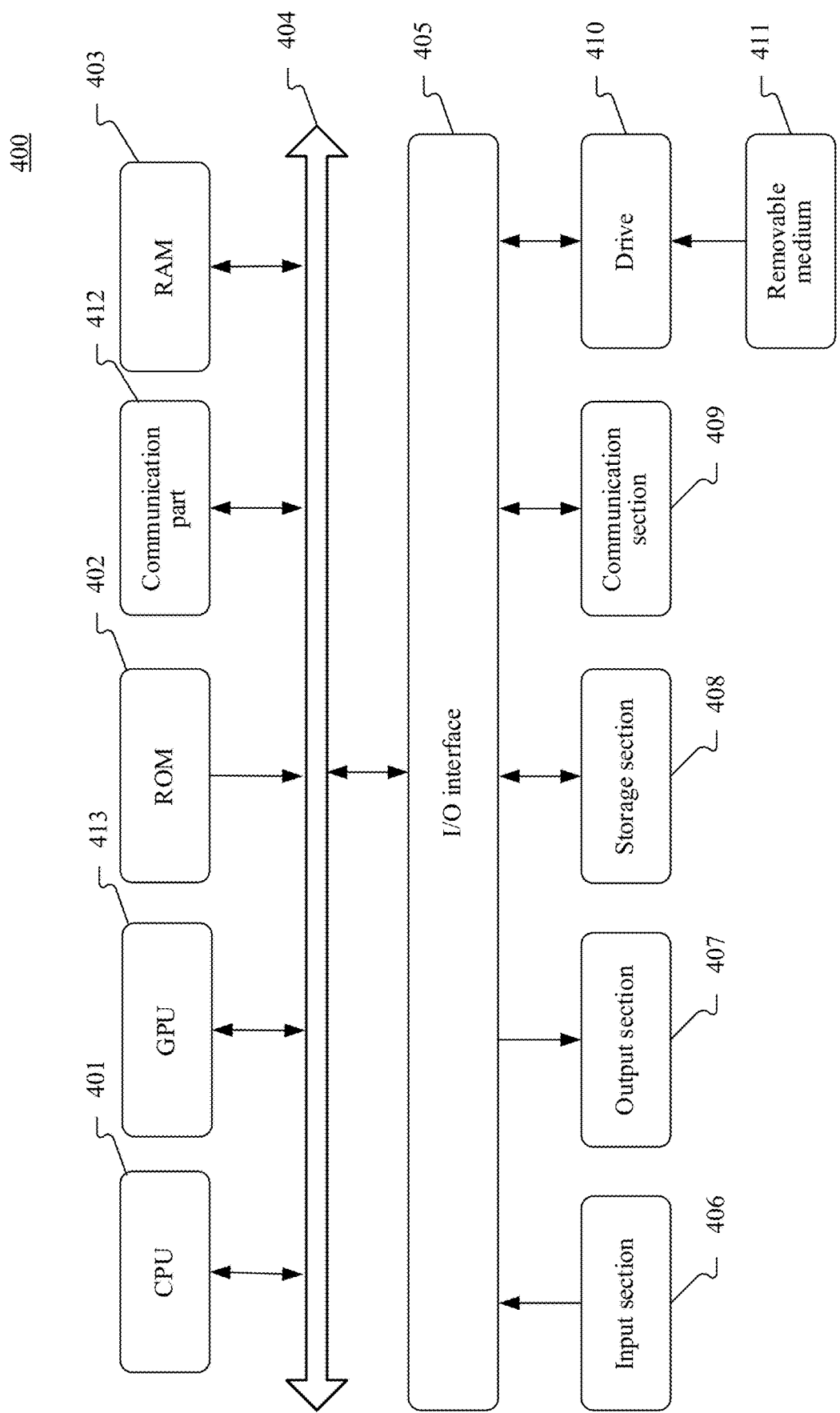
FIG. 4 is a block diagram of an exemplary device for implementing an implementation of the present disclosure.

FIG. 4 illustrates an exemplary device 400 suitable for implementing the present disclosure. The device 400 may be a mobile terminal (for example, a smart mobile phone or the like), a Personal Computer (PC) (for example, a desktop computer or a notebook computer or the like), a tablet computer, a server or the like. In FIG. 4, the device 400 includes one or more processors, a communication part, and the like. The one or more processors are one or more Central Processing Units (CPUs) 401 and/or one or more Graphic Processing Units (GPUs) 413 or the like, and the processors may perform various appropriate actions and processing according to executable instructions stored in a Read-Only Memory (ROM) 402 or executable instructions loaded from a storage section 408 to a Random Access Memory (RAM) 403. The communication part 412 may include, but is not be limited to, a network card. The network card may include, but is not be limited to, an Infiniband (IB) network card. The processor may communicate with the ROM 402 and/or the RAM 403, to execute executable instructions. The processor is connected to the communication part 404 via a bus 412, and communicates with other target devices via the communication part 412, thereby implementing corresponding operations in the present disclosure. In one optional example, the operations executed by the processor include: performing filtering processing on a to-be-processed image to obtain an image subjected to the filtering processing; determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point. In another optional example, the operations executed by the processor include: an operation of performing filtering processing on a to-be-processed image, and the operation of performing filtering processing on a to-be-processed image specifically includes: obtaining pixel values of a part of pixel points within a sliding window; and updating pixel values of pixel points at predetermined positions within the sliding window according to a calculation result of the pixel values of a part of the pixel points.

In addition, the RAM 403 further may store various programs and data required for operations of an apparatus. The CPU 401, the ROM 402, and the RAM 403 are connected to each other via the bus 404. In the presence of the RAM 403, the ROM 402 is an optional module. The RAM 403 stores executable instructions, or writes the executable instructions into the ROM 402 during running, where the executable instructions cause the CPU 401 to execute operations included in the foregoing object segmentation method. An input/output (I/O) interface 405 is also connected to the bus 404. The communication part 412 may be configured integrally, and may also be configured to have multiple sub-modules (for example, multiple IB network cards) respectively connected to the bus.

The following components are connected to the I/O interface 405: an input section 406 including a keyboard, a mouse, and the like; an output section 407 including a Cathode-Ray Tube (CRT), a Liquid Crystal Display (LCD), a speaker, and the like; a storage section 408 including a hard disk and the like; and a communication section 409 of a network interface card including an LAN card, a modem, and the like. The communication section 409 performs communication processing via a network such as the Internet. A drive 410 is also connected to the I/O interface 405 according to requirements. A removable medium 411 such as a magnetic disk, an optical disk, a magneto-optical disk, a semiconductor memory is installed on the drive 410 according to requirements, so that a computer program read from the removable medium is installed on the storage section 408 according to requirements.

It should be particularly noted that, the architecture illustrated in FIG. 4 is merely an optional implementation. During specific practice, the number and types of the components in FIG. 4 may be selected, decreased, increased, or replaced according to actual requirements. Different functional components may be configured respectively or integrally or the like. For example, the GPU 413 and the CPU 401 may be configured respectively. For another example, the GPU 413 may be integrated on the CPU 401, and the communication part may be configured respectively, and may also be configured integrally on the CPU 401 or the GPU 413 or the like. These alternative implementations all fall within the scope of protection of the present disclosure.

Particularly, according to the implementations of the present disclosure, the process described below with reference to a flowchart may be implemented as a computer software program. For example, the implementations of the present disclosure include a computer program product, which includes a computer program tangibly included in a machine-readable medium. The computer program includes a program code for performing operations shown in the flowchart. The program code may include instructions for correspondingly performing operations provided in the present disclosure, for example, an executable instruction for performing filtering processing on a to-be-processed image to obtain an image subjected to the filtering processing; an executable instruction for determining similarity degrees between pixel points in the to-be-processed image and a target region of a target object in the to-be-processed image; and an executable instruction for fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point; and for another example, an instruction for performing filtering processing on a to-be-processed image, and the instruction for performing filtering processing on a to-be-processed image includes: an executable instruction for obtaining pixel values of a part of pixel points within a sliding window; and an executable instruction for updating pixel values of pixel points at predetermined positions within the sliding window according to a calculation result of the pixel values of the a part of the pixel points.

In such implementations, the computer program may be downloaded and installed from the network through the communication section 409, and/or may be installed from the removable medium 411. The computer program, when being executed by the CPU 401, executes the foregoing instructions described in the present disclosure.

The technical solutions for implementing image enhancement provided in the present disclosure may be implemented by an electronic device such as a smart mobile phone, a desktop computer, a notebook computer, a camera, a tablet computer, or a server that can run a computer program (which may also be referred to as program code), and the computer program may be stored in a computer-readable storage medium such as a flash memory, a cache, a hard disk, or an optical disk.

Figure 5:
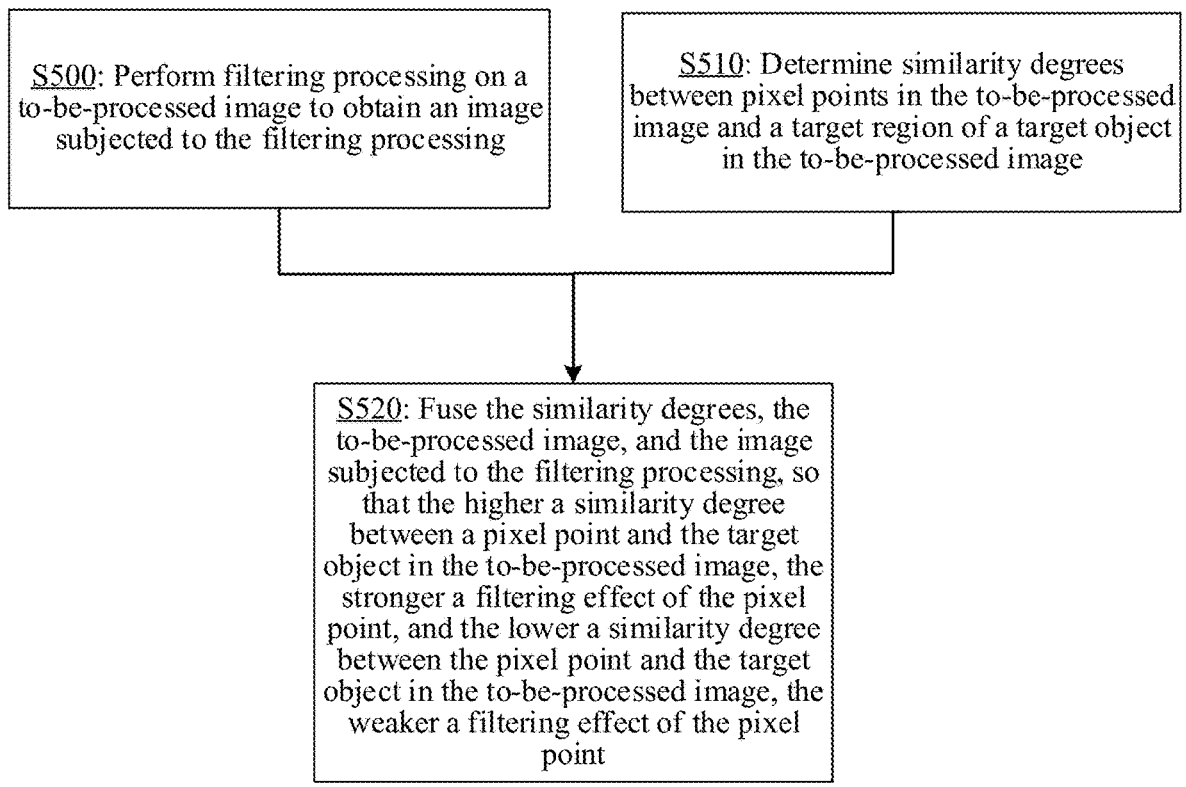
FIG. 5 is a flowchart of one implementation of a method for implementing image enhancement according to the present disclosure.
Figure 6:
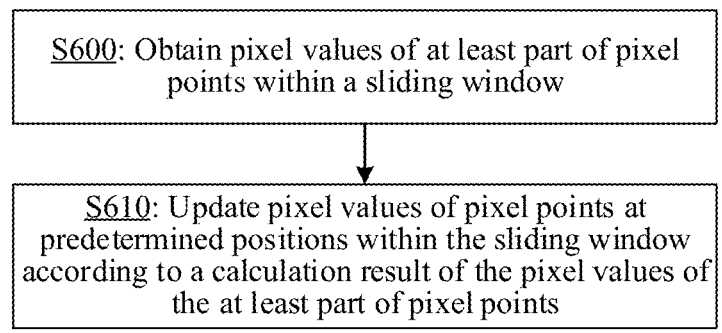
FIG. 6 is a flowchart of another implementation of a method for implementing image enhancement according to the present disclosure.
Figure 11:
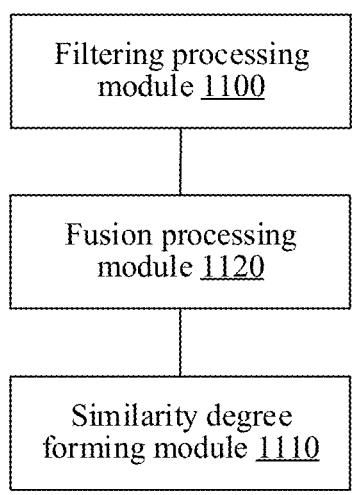
FIG. 11 is a schematic structural diagram of one implementation of an apparatus for implementing image enhancement according to the present disclosure.

FIG. 5 is a flowchart of one implementation of a method for implementing image enhancement according to the present disclosure. FIG. 11 is a schematic structural diagram of one implementation of an apparatus for implementing image enhancement according to the present disclosure. In FIG. 11, a filtering processing module 1100, a fusion processing module 1120, and a similarity degree forming module 1110 are included. In FIG. 5, at S500, filtering processing is performed on a to-be-processed image to obtain an image subjected to the filtering processing.

In an optional example, operation S500 in the present disclosure may be executed by a processor by invoking an instruction for filtering processing stored in a memory, or may be executed by a filtering processing module 1100 run by the processor.

In one optional example, the to-be-processed image in the present disclosure may be a picture, or a photo, or an image frame in a video, or the like; and if the to-be-processed image is an image frame in a video, the filtering processing module 1100 may respectively perform filtering processing on at least one image frame in the video in real time, so that image enhancement processing may be performed on the video. In addition, the to-be-processed image in the present disclosure may be an original image, and may also be an image subjected to preprocessing such as denoising. The present disclosure does not limit a specific representation form of the to-be-processed image.

Figure 12:
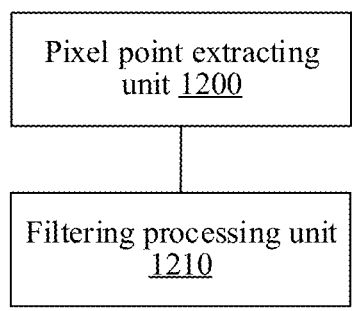
FIG. 12 is a schematic structural diagram of another implementation of an apparatus for implementing image enhancement according to the present disclosure.

In one optional example, the filtering processing module 1100 may perform filtering processing on a to-be-processed image in an existing filtering processing mode; and the filtering processing module 1100 may also perform filtering processing on the to-be-processed image in a point-extraction filtering mode. That is to say, operation S500 may include: operation S600 and operation S610. Operation S600 is obtaining pixel values of at least part of pixel points within a sliding window; and operation S610 is updating pixel values of pixel points at predetermined positions within the sliding window according to a calculation result of the obtained pixel values of the at least part of pixel points. FIG. 12 is a schematic structural diagram of another implementation of an apparatus for implementing image enhancement according to the present disclosure. As shown in FIG. 12, the filtering processing module 1100 in the present disclosure may include: a pixel point extracting unit 1200 and a filtering processing unit 1210. The pixel point extracting unit 1200 is mainly configured to obtain pixel values of at least part of pixel points within a sliding window, and the filtering processing unit 1210 may update pixel points (for example, a central pixel point within the sliding window) at predetermined positions within the sliding window by using a calculation result of the pixel values of the at least part of pixel points within the sliding window; and after the filtering processing module 1100 (for example, the pixel point extracting unit 1200 or the filtering processing unit 1210) controls the sliding window to complete a sliding operation in a to-be-processed image, the filtering processing module 1100 completes a filtering processing operation to obtain an image subjected to the filtering processing.

In one optional example, the shape of the sliding window in the present disclosure may be square, and the side length of the sliding window is generally an odd number of pixel points, so as to determine the central point (i.e., the central pixel point) of the sliding window. Optionally, the ratio of the number of the extracted pixel points in the present disclosure to the total number of the pixel points within the sliding window may be set to be from $\frac{1}{10}$ to $\frac{1}{30}$, and the number of the extracted pixel points may be set according to actual requirements, for example, the number of the extracted pixel points may be determined by evaluating the real-time property of image enhancement processing and the picture effect of image enhancement processing.

In one optional example, at least part of pixel points may generally be uniformly distributed in the sliding window. For example, at least two concentric circles are drawn by taking the central pixel point of the sliding window as the center of a circle, while the multiple extracted pixel points may be uniformly distributed on the circumference of each concentric circle; for another example, the central pixel point of the sliding window is taken as the central intersection of a Chinese character "米", the multiple extracted pixel points may be uniformly distributed in the strokes of the "米"; and for still another example, at least two squares having the same central point are drawn by taking the central pixel point of the sliding window as the central point of a square, while the multiple extracted pixel points may be uniformly distributed on the sides of the squares having the same central point. The present disclosure does not limit a specific implementation mode in which the multiple extracted pixel points are uniformly distributed in the sliding window.

In one optional example, there are weight values corresponding to the multiple extracted pixel points, and the sizes of the weight values corresponding to the multiple pixel points may be related to the distances from the pixel points respectively to the central point of the sliding window. For example, the shorter a distance from a pixel point in the multiple extracted pixel points to the central point of the sliding window, the larger a weight value corresponding to the pixel point, while the longer a distance from a pixel point in the multiple extracted pixel points to the central point of the sliding window, the smaller a weight value corresponding to the pixel point; and if distances from two extracted pixel points respectively to the central point of the sliding window are equal, weight values corresponding to the two extracted pixel points are generally equal, for example, weight values corresponding to the multiple extracted pixel points located on a same circumference are equal.

Figure 7:
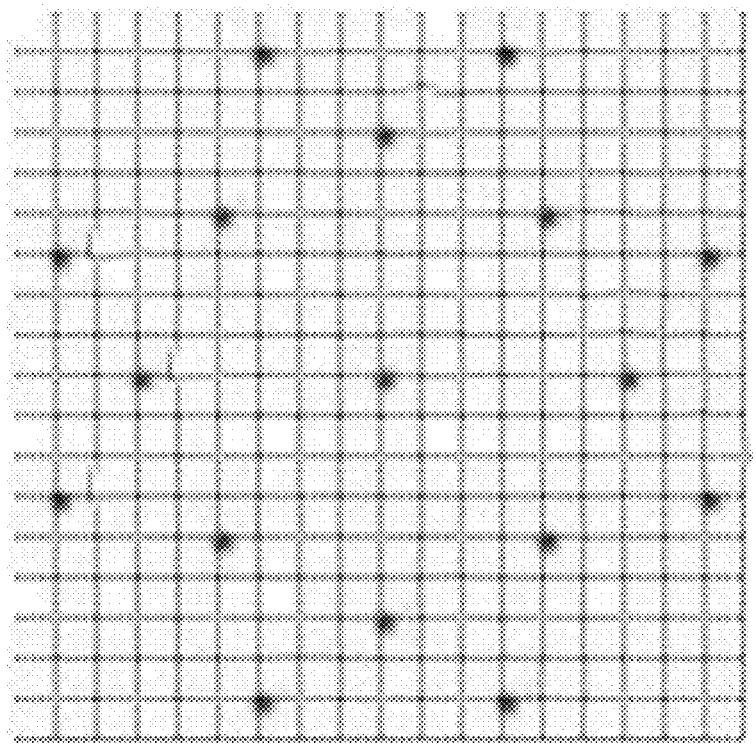
FIG. 7 is a schematic diagram of pixel points selected in a filtering process according to embodiments of the present disclosure.

In one optional implementation mode, one optional example in which the filtering processing module 1100 performs filtering processing on the to-be-processed image in a point-extraction filtering mode is: with reference to FIG. 7, the shape of a sliding window is set to be a square with a side length of 17 pixel points (one vertex of each small square in FIG. 7 is one pixel point in the sliding window), the filtering processing module 1100 (for example, a pixel point extracting unit 1200 or a filtering processing unit 1210) controls the sliding window to slide, in a manner of a step length of 1 pixel point, in the to-be-processed image in an order from the left side of the image to the right side of the image and from the upper side of the image to the lower side of the image, and thus the number of pixel points within the sliding window after each time slide is 17×17=289; the number of pixel points extracted by the filtering processing module 1100 (for example, the pixel point extracting unit 1200) from 289 pixel points in the sliding window after each time slide is set to be 16, and the filtering processing module 1100 (for example, the pixel point extracting unit 1200) extracts 16 pixel points from the sliding window according to positions shown by round points other than a round point at the central position of the sliding window as shown in FIG. 7; and the filtering processing module 1100 (for example, the filtering processing unit 1210) calculates pixel values of the 16 extracted pixel points and weight values respectively corresponding to the 16 pixel points, for example, the filtering processing module 1100 (for example, the filtering processing unit 1210) respectively multiplies the pixel values of the 16 pixel points by the weight values corresponding thereto, so as to obtain 16 products, and the filtering processing module 1100 (for example, the filtering processing unit 1210) calculates a sum of the 16 products. The filtering processing module 1100 (for example, the filtering processing unit 1210) may replace a pixel value of a pixel point at a predetermined position in the sliding window with the calculated sum of the products. In general, the filtering processing module 1100 (for example, the filtering processing unit 1210) may replace a pixel value of a central point in the sliding window with the calculated sum of the products. The central point in the sliding window is a round point located at a position in row 9 and column 9 as shown in FIG. 7. Certainly, the present disclosure does not exclude a possibility that the filtering processing module 1100 (for example, the filtering processing unit 1210) replaces a pixel value of a pixel point left/right/up/down adjacent to the central point in the sliding window with the calculated sum of the products. For example, the filtering processing module 1100 (for example, the filtering processing unit 1210) replaces a pixel value of a pixel point at a position in row 9 and column 10 in the sliding window with the calculated sum of the products.

Figure 8:
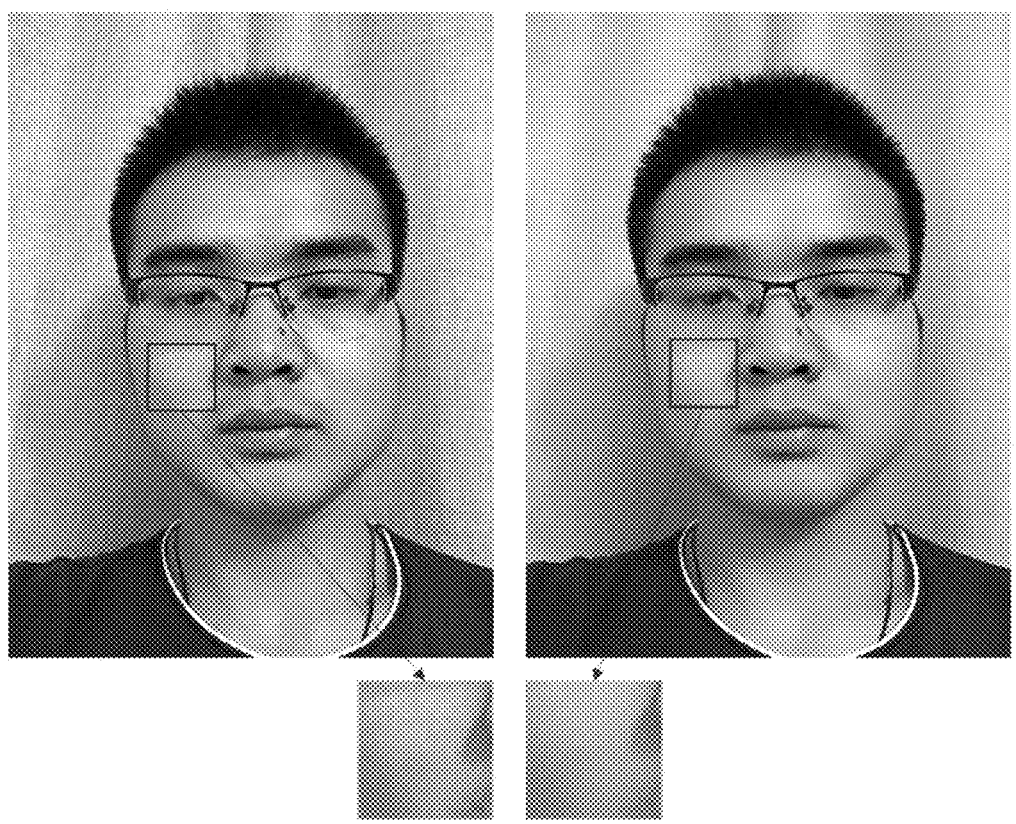
FIG. 8 is a comparative schematic diagram of images before and after filtering processing according to embodiments of the present disclosure.

In one optional example, before the filtering processing module 1100 performs filtering processing on the to-be-processes image, as shown in the upper left drawing in FIG. 8, after the filtering processing module 1100 performs filtering processing on the to-be-processes image in a point-extraction filtering mode, the obtained image subjected to the filtering processing is as shown in the upper right drawing in FIG. 8; moreover, the lower left drawing and lower right drawing in FIG. 8 are respectively enlarged drawings of a skin region at a same position at one side of the nose of the human face in the upper left drawing and upper right drawing; as can be seen from the two enlarged drawings in FIG. 8, in the image subjected to the filtering processing, the dark spots on the skin of the human face are lightened or even removed; however, as felt from the upper left drawing and upper right drawing in FIG. 8, some details (for example, a texture on a curtain, and the like) on the background (for example, the curtain behind the person) of the person are also lightened or even removed.

As can be known from the foregoing optional example, if the filtering processing module 1100 uses the point-extraction filtering mode, for each slide of the sliding window, the filtering processing module 1100 generally may need to execute 16 multiplication operations and 15 addition operations; however, if the filtering processing module 1100 uses a non-point-extraction filtering mode, for each slide of the sliding window, the filtering processing module 1100 generally may need to execute 288 multiplication operations and 287 addition operations. Upon comparison, the present disclosure greatly reduces the amount of multiplication and addition operations in an image enhancement process, thereby making it possible for the technical solutions for implementing image enhancement in the present disclosure to be applied to a video.

It should be particularly noted that, although the present disclosure does not limit a specific position of the pixel point at the predetermined position with the replaced pixel value in the sliding window (for example, which may be located at the central position in the sliding window, and may also be located at the pixel point left/right/up/down adjacent to the central point in the sliding window), in the process that the sliding window slides on the to-be-processed image, the predetermined position is not changed. For example, for each slide of the sliding window, the pixel value of the pixel point at the position in row 9 and column 10 in the sliding window is replaced with a current calculation result.

In one optional example, if it is required to replace the pixel value of each pixel point in the to-be-processed image, in the present disclosure, expansion processing may be performed in advance on the to-be-processed image, so that the pixel point in row X and column X at the outermost side in the to-be-processed image before the expansion processing may be located at the predetermined position (for example, the position of the central point) in the sliding window; however, if the expansion processing is not performed on the to-be-processed image, the pixel value of the pixel point in row X and column X at the outermost side in the to-be-processed image is generally not be replaced. If the predetermined position is the central position, the X is generally (L−1)/2, L means the side length of the sliding window. One optional example for performing expansion processing on the to-be-processed image in the present disclosure is: the shape of the sliding window is set to be a square with a side length of 17 pixel points, and the length and width of the to-be-processed image are set to be 300 pixel points respectively; and in the case of the foregoing setting, the filtering processing module 1100 may expand the to-be-processed image into an image with a length and width of 316 pixel points respectively, for example, the filtering processing module 1100 may expand the length and width of the to-be-processed image to 316 pixel points in an expansion manner of copying the pixel values of the pixel points at the outermost side of the to-be-processed image.

In one optional example, image content at an edge position of the to-be-processed image may be generally not an important part of image content displayed by the to-be-processed image, and therefore, the filtering processing module 1100 may not perform expansion processing on the to-be-processed image.

At S510, similarity degrees between pixel points in the to-be-processed image and a target region of a target object in the to-be-processed image are determined. The similarity degrees may form a similarity degree template.

In an optional example, operation S510 in the present disclosure may be executed by a processor by invoking an instruction for forming similarity degrees stored in a memory, or may be executed by a similarity degree forming module 1110 run by the processor.

In one optional example, the target object in the present disclosure is generally a human face. Certainly, the target object may also be other objects having certain features, for example, an automobile having fixed features, such as wheels, lights, a license plate, and a windshield, and the like. If the target object is a human face, the target region in the present disclosure is generally a local skin region on the human face determined based on a human face key point, for example, a skin region nearby a nose determined based on a nose key point of the person; the skin region nearby the nose may be a square region by taking the nose key point as a center; the skin region nearby the nose may also be a square region by taking the nose key point as a vertex, and the like; and a side length of the square region may be 100 pixel points and the like.

In one optional example, in the present disclosure, if it is required to perform image enhancement processing on a video (i.e., if the to-be-processed image is an image frame in a video), the similarity degree forming module 1110 may detect a human face key point (such as a nose key point) in the image frame in real time by using an existing facial key point detection technology, and determine a local skin region (for example, a skin region nearby a nose) on a human face, according to the detected human face key point; the similarity degree forming module 1110 may calculate similarity degrees of pixel points in the image frame and the local skin region in real time, and the similarity degree forming module 1110 may form a similarity degree template by using the at least one calculated similarity degree. The pixel points in the image frame may be generally all the pixel pints in the image frame. Certainly, the pixel points in the image frame may also be pixel points in a local region in the image frame (for example, multiple pixel points nearby the target region in the image frame, and the like). The present disclosure does not specifically define the pixel points in the image frame.

There is no dependency relationship between the filtering process in operation S500 and determination of similarity degree in operation S510, and therefore, the filtering process in the present disclosure and the determination of similarity degree in the present disclosure may be executed in parallel, thereby making it possible for the technical solutions for implementing image enhancement in the present disclosure to be applied to a video.

An optional example in which the similarity degree forming module 1110 forms a similarity degree template is as follows.

Firstly, the similarity degree forming module 1110 calculates a mean value and a variance of pixel values of the target region according to pixel values of multiple pixel points in the target region (for example, a part or all of the pixel points in the target region) determined thereby, for example, the similarity degree forming module 1110 calculates the mean value of pixel values of the target region mean by using the following formula (1), and calculates the variance of pixel values of the target region var by using the following formula (2).

$$\text{mean} = (x_1 + x_2 + \ldots + x_n)/n \quad (1)$$

$$\text{var}^2 = \frac{(x_1 - \text{mean})^2 + (x_2 - \text{mean})^2 + \ldots + (x_n - \text{mean})^2}{n} \quad (2)$$

In the formulas (1) and (2) above, $X_1$ represents a pixel value of the first pixel point in a to-be-processed image, $X_2$ represents a pixel value of the second pixel point in the to-be-processed image, $X_n$ represents a pixel value of the nth pixel point in the to-be-processed image, n represents the number of pixel points included in the to-be-processed image, mean represents the mean value of pixel values of the target region, and var represents the variance of pixel values of the target region.

Secondly, the similarity degree forming module 1110 calculates, according to the pixel values of the pixel points in the to-be-processed image (for example, at least one pixel point in the to-be-processed image or multiple pixel points nearby the target region), the mean value and the variance, similarity degrees between the pixel points in the to-be-processed image and the target region of the target object in the to-be-processed image by using the following formula (3).

$$\text{prob} = \frac{\text{pixel-mean}}{\text{var}} \quad (3)$$

In the formula (3) above, prob represents a similarity degree calculated for one pixel point in the to-be-processed image, pixel represents a pixel value of the pixel point in the to-be-processed image, mean represents a mean value of pixel values of the target region, and var represents a variance of pixel values of the target region.

Finally, the similarity degree forming module 1110 performs normalization processing on the at least one similarity degree prob calculated thereby, and the similarity degree forming module 1110 forms a similarity degree template by using the at least one prob after the normalization processing, i.e., the similarity degree template in the present disclosure is generally a normalized similarity degree template.

In one optional example, the similarity degree determined by the similarity degree forming module 1110 is generally a similarity degree based on RGB (i.e., Red Green Blue) three channels, and thus the similarity degree template formed by the similarity degree forming module 1110 is generally a similarity degree template formed based on the RGB (i.e., Red Green Blue) three channels. Certainly, the similarity degree determined by the present disclosure may also be a similarity degree based on CrCb (hue and saturation) channels of a YcrCb (i.e., YUV, optimization of color video signals) space, or a similarity degree based on IQ (hue) channels of a YIQ (gray-scale value and hue) space, and thus the similarity degree template formed by the similarity degree forming module 1110 may also be a similarity degree template based on the CrCb channels of the YcrCb space or a similarity degree template based on the IQ channels of the YIQ space, and the like. Optionally, in the present disclosure, the similarity degree may be calculated on the CrCb channels of the YcrCb space according to a Gaussian mixture model and the similarity degree template is formed. The present disclosure does not limit a specific implementation mode of forming the similarity degree template.

Figure 9:
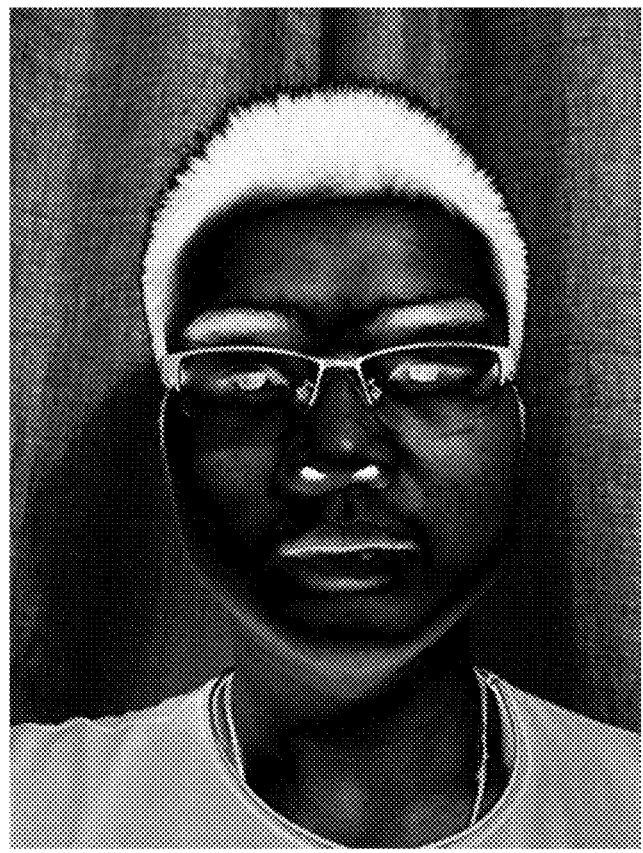
FIG. 9 is a schematic diagram of a similarity degree template according to embodiments of the present disclosure.

In one optional example, when calculating a similarity degree (for example, calculating prob), similarity degree forming module 1110 may calculate the similarity degree based on a local skin region of a human face, and when the similarity degree is a similarity degree based on RGB three channels, a similarity degree template formed by such a similarity degree may be referred to as a skin color similarity degree template. In respect of visual sensation, in the skin color similarity degree template, the higher a similarity degree in skin color between a part and the human face in a to-be-processed image, the blacker the color displayed by the part, while the lower a similarity degree in skin color between a part and the human face in a to-be-processed image, the whiter the color displayed by the part. For example, the similarity degree template formed for the upper left drawing in FIG. 8 is as shown in FIG. 9, as can be seen from the similarity degree template shown in FIG. 9, the higher a similarity degree in skin color between a part and a skin region nearby a nose of the person in the upper left drawing in FIG. 8, the blacker the color displayed by the part, while the lower a similarity degree in skin color between a part and a skin region nearby the nose of the person in the upper left drawing in FIG. 8, the whiter the color displayed by the part.

At S520, the similarity degrees (such as a similarity degree template), the to-be-processed image and the image subjected to the filtering processing are fused, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point.

In an optional example, operation S520 in the present disclosure may be executed by a processor by invoking an instruction for performing image fusion stored in a memory, or may be executed by a fusion processing module 1120 run by the processor.

In one optional example, the fusion processing module 1120 may perform linear superposition on the similarity degrees (such as a similarity degree template), the to-be-processed image and the image subjected to the filtering processing, so as to implement fusion thereof. The fusion processing module 1120 may perform linear superposition processing by using the following formula (4).

$$\text{result} = \text{sqrt}(\text{alpha}) \times \text{origin} + (1 - \text{sqrt}(\text{alpha})) \times \text{smooth} \quad (4)$$

In the formula (4) above, result represents an image after the linear superposition processing, sqrt(*) represents performing an extraction-of-square-root operation on *, alpha represents a pixel value of at least one pixel point in a similarity degree template (such as a normalized similarity degree template), origin represents a pixel value of at least one pixel point in a to-be-processed image before filtering processing (for example, an original image), and smooth represents a pixel value of at least one pixel point in the image subjected to the filtering processing.

Figure 10:
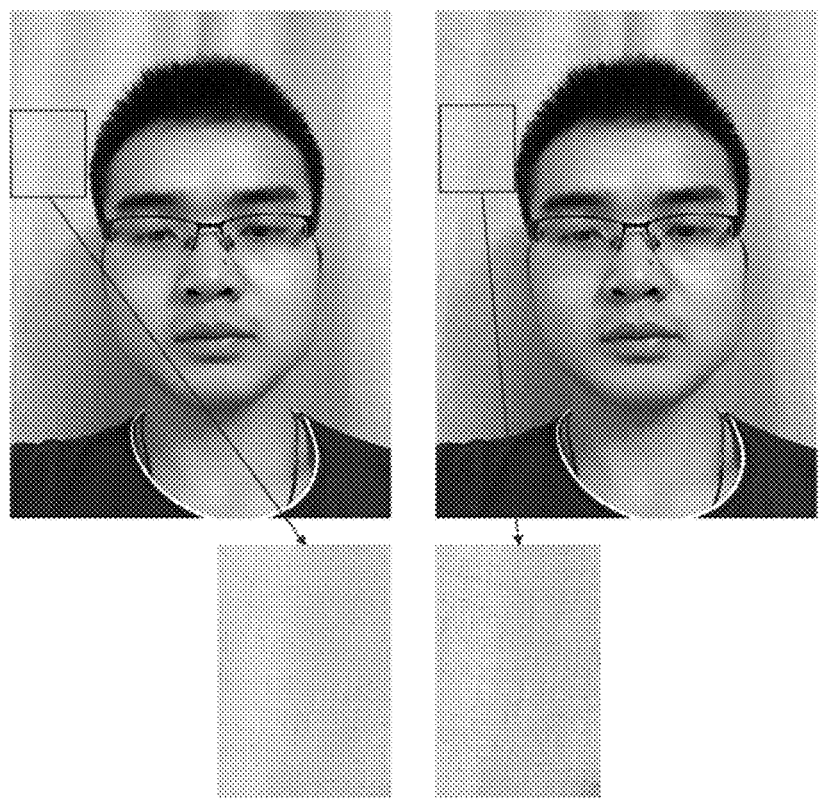
FIG. 10 is a comparative schematic diagram of images before and after performing fusion based on a similarity degree template according to embodiments of the present disclosure.

If the similarity degree template is a skin color similarity degree template, the fusion processing module 1120 performs linear superposition on the similarity degree template, the to-be-processed image and the image subjected to the filtering processing, so that details, that are different from the skin color to a certain extent and lightened or even removed after the filtering processing, in the image subjected to the filtering processing, are displayed again in the image after the linear superposition processing, for example, in the upper right drawing and lower right drawing in FIG. 8, the dark spots on the human face in the image subjected to the filtering processing are lightened or even removed; however, as can be seen from the upper left drawing (i.e., the image subjected to the filtering processing) and the lower left drawing (an enlarged drawing of a square box in the upper left drawing in FIG. 10) in FIG. 10, some details (for example, a texture on a curtain, and the like) on the background (for example, the curtain) of the person in the image subjected to the filtering processing are also lightened or even removed; in the present disclosure, by performing linear superposition processing, an updated drawing (i.e., the upper right drawing in FIG. 10) corresponding to the to-be-processed image is obtained, the position of the square box in the updated drawing is the same as that of the square box in the upper left drawing in FIG. 10, and an enlarged drawing of the square box in the updated drawing is as shown in the lower right drawing in FIG. 10; and as can be known by comparing the two enlarged drawings in FIG. 10, after the fusion processing in the present disclosure, some details (for example, the texture on the curtain, and the like) on the background (for example, the curtain) that are different to a certain extent in skin color from the skin region nearby the nose of the person in the to-be-processed image are displayed again.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing sequence of the operations of the method is merely for description, and unless otherwise stated particularly, is not intended to limit the operations of the method in the present disclosure. Furthermore, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for implementing image enhancement, comprising:
    performing filtering processing on a to-be-processed image to obtain an image subjected to the filtering processing;
    determining similarity degrees between pixel points in the to-be-processed image and a target region of a target object in the to-be-processed image; and
    fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point,
    wherein said performing filtering processing on the to-be-processed image comprises:
    performing filtering processing on the to-be-processed image in a manner of updating pixel values of pixel points at predetermined positions within a sliding window by using a calculation result of pixel values of at least part of pixel points within the sliding window,
    wherein said performing filtering processing on the to-be-processed image in a manner of updating pixel values of pixel points at predetermined positions within a sliding window by using a calculation result of pixel values of at least part of pixel points within the sliding window comprises:
    causing an N×N sliding window to slide in the to-be-processed image, wherein a side length N of the sliding window is an odd number of pixel points not less than 3;
    for any one slide of the sliding window, extracting pixel values of a part of pixel points from pixels values of N×N pixel points within the sliding window, performing weighted summing on at least one extracted pixel value to obtain an updated pixel value, and replacing pixel values of pixel points at predetermined positions within the sliding window with the updated pixel value, wherein a number of pixel points included in the part of pixel points of which the pixel values are extracted is determined by evaluating a real-time property of image enhancement processing and a picture effect of the image enhancement processing; and
    after the sliding window completes all sliding operations in the to-be-processed image, obtaining the image subjected to the filtering processing.

2. The method according to claim 1, wherein sizes of weight values respectively corresponding to the at least part of pixel points are inversely proportional to distances from the at least part of pixel points respectively to a central point of the sliding window.

3. The method according to claim 1, wherein a ratio of a number of pixel points of the at least part of pixel points within the sliding window to a number of all the pixel points within the sliding window is from $\frac{1}{10}$ to $\frac{1}{30}$.

4. The method according to claim 1, wherein the at least part of pixel points comprise multiple pixel points, and the multiple pixel points are uniformly distributed within the sliding window.

5. The method according to claim 1, wherein the to-be-processed image comprises: image frames in a video; and said performing filtering processing on the to-be-processed image comprises:
respectively performing filtering processing on multiple image frames in the video in real time.

6. The method according to claim 1, wherein the target object comprises: a human face; and the target region comprises: a local skin region on the human face determined based on a human face key point.

7. The method according to claim 6, wherein the local skin region comprises: a square region centered on a nose key point.

8. The method according to claim 6, wherein when the to-be-processed image comprises image frames in a video, said determining similarity degrees between pixel points in the to-be-processed image and the target region of the target object in the to-be-processed image comprises:
for one image frame in the video, detecting a human face key point in the image frame in real time, determining the local skin region on the human face according to the detected human face key point, and determining similarity degrees between pixel points in the image frame and the local skin region in real time.

9. The method according to claim 1, wherein said determining similarity degrees between pixel points in the to-be-processed image and the target region of the target object in the to-be-processed image comprises:
calculating a mean value and a variance of pixel values of the target region according to the pixel values of pixel points in the target region;
calculating a similarity degree between at least one pixel point and the target region of the target object in the to-be-processed image according to a pixel value of the at least one pixel point in the to-be-processed image, the mean value and the variance; and
performing normalization processing on the similarity degree.

10. The method according to claim 1, wherein the similarity degree comprises: a similarity degree based on Red Green Blue (RGB) three channels, a similarity degree based on hue and saturation CrCb channels of an optimization-of-color-video-signal YcrCb space, or a similarity degree based on hue IQ channels of a gray-scale value and hue YIQ space.

11. The method according to claim 1, wherein said fusing the similarity degrees, the to-be-processed image and the image subjected to the filtering processing comprises:
performing linear superposition on the similarity degrees, the to-be-processed image and the image subjected to the filtering processing.

12. An electronic device, comprising:
a memory, configured to store a computer program; and
a processor, configured to execute the computer program stored in the memory, wherein when the computer program is executed, the following instructions are run:
an instruction for performing filtering processing on a to-be-processed image to obtain an image subjected to the filtering processing;
an instruction for determining similarity degrees between pixel points in the to-be-processed image and a target region of a target object in the to-be-processed image; and
an instruction for fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point,
wherein the instruction for performing filtering processing on a to-be-processed image comprises:
an instruction for performing filtering processing on the to-be-processed image in a manner of updating pixel values of pixel points at predetermined positions within a sliding window by using a calculation result of pixel values of at least part of pixel points within the sliding window,
wherein the instruction for performing filtering processing on the to-be-processed image in a manner of updating pixel values of pixel points at predetermined positions within a sliding window by using a calculation result of pixel values of at least part of pixel points within the sliding window is specifically:
an instruction for causing an N×N sliding window to slide in the to-be-processed image, wherein a side length N of the sliding window is an odd number of pixel points not less than 3;
for any one slide of the sliding window, an instruction for extracting pixel values of a part of pixel points from pixels values of N×N pixel points within the sliding window, performing weighted summing on at least one extracted pixel value to obtain an updated pixel value, and replacing pixel values of pixel points at predetermined positions within the sliding window with the updated pixel value, wherein a number of pixel points included in the part of pixel points of which the pixel values are extracted is determined by evaluating a real-time property of image enhancement processing and a picture effect of the image enhancement processing; and
after the sliding window completes all sliding operations in the to-be-processed image, obtaining the image subjected to the filtering processing.

13. The electronic device according to claim 12, wherein sizes of weight values respectively corresponding to the at least part of pixel points are inversely proportional to distances from the at least part of pixel points respectively to a central point of the sliding window.

14. The electronic device according to claim 12, wherein a ratio of a number of pixel points of the at least part of pixel points within the sliding window to a number of all the pixel points within the sliding window is from $\frac{1}{10}$ to $\frac{1}{30}$.

15. The electronic device according to claim 12, wherein the at least part of pixel points comprise multiple pixel points, and the multiple pixel points are uniformly distributed within the sliding window.

16. A non-transitory computer-readable storage medium having stored thereon computer-readable instructions that, when executed by a processor, cause the processor to perform a method for implementing image enhancement, the method comprising:
performing filtering processing on a to-be-processed image to obtain an image subjected to the filtering processing;
determining similarity degrees between pixel points in the to-be-processed image and a target region of a target object in the to-be-processed image; and fusing the similarity degrees, the to-be-processed image and the image subjected to the filtering processing, so that the higher a similarity degree between a pixel point and the target object in the to-be-processed image, the stronger a filtering effect of the pixel point, and the lower a similarity degree between the pixel point and the target object in the to-be-processed image, the weaker a filtering effect of the pixel point, wherein said performing filtering processing on the to-be-processed image comprises:

performing filtering processing on the to-be-processed image in a manner of updating pixel values of pixel points at predetermined positions within a sliding window by using a calculation result of pixel values of at least part of pixel points within the sliding window, wherein said performing filtering processing on the to-be-processed image in a manner of updating pixel values of pixel points at predetermined positions within a sliding window by using a calculation result of pixel values of at least part of pixel points within the sliding window comprises:

causing an N×N sliding window to slide in the to-be-processed image, wherein a side length N of the sliding window is an odd number of pixel points not less than 3;

for any one slide of the sliding window, extracting pixel values of a part of pixel points from pixels values of N×N pixel points within the sliding window, performing weighted summing on at least one extracted pixel value to obtain an updated pixel value, and replacing pixel values of pixel points at predetermined positions within the sliding window with the updated pixel value, wherein a number of pixel points included in the part of pixel points of which the pixel values are extracted is determined by evaluating a real-time property of image enhancement processing and a picture effect of the image enhancement processing; and after the sliding window completes all sliding operations in the to-be-processed image, obtaining the image subjected to the filtering processing.

17. The non-transitory computer-readable storage medium according to claim 16, wherein sizes of weight values respectively corresponding to the at least part of pixel points are inversely proportional to distances from the at least part of pixel points respectively to a central point of the sliding window.

18. The non-transitory computer-readable storage medium according to claim 16, wherein a ratio of a number of pixel points of the at least part of pixel points within the sliding window to a number of all the pixel points within the sliding window is from $1/10$ to $1/30$.

19. The non-transitory computer-readable storage medium according to claim 16, wherein the at least part of pixel points comprise multiple pixel points, and the multiple pixel points are uniformly distributed within the sliding window.

20. The non-transitory computer-readable storage medium according to claim 16, wherein the to-be-processed image comprises: image frames in a video; and performing filtering processing on the to-be-processed image comprises:

respectively performing filtering processing on multiple image frames in the video in real time.

* * * * *